United States Patent [19]

Jenkins et al.

[11] Patent Number: 4,535,203

[45] Date of Patent: Aug. 13, 1985

[54] BRIDGE RECTIFIER CIRCUIT

[75] Inventors: James O. M. Jenkins; Nigel C. Gardner, both of Swansea, Wales

[73] Assignee: Siliconix Limited, United Kingdom

[21] Appl. No.: 558,830

[22] Filed: Dec. 7, 1983

[30] Foreign Application Priority Data

Dec. 8, 1982 [GB] United Kingdom ............... 8235044

[51] Int. Cl.³ .............................................. H03K 5/22
[52] U.S. Cl. .................................. 179/81 R; 307/257; 363/127
[58] Field of Search ........................... 179/81 R, 84 R; 363/127; 307/571, 575, 577, 257, 254

[56] References Cited

U.S. PATENT DOCUMENTS 4,213,012 7/1980 Carroll et al. ..................... 179/84 R
4,319,144 3/1982 King et al. ........................ 363/127 X

FOREIGN PATENT DOCUMENTS 851375 10/1960 United Kingdom .
1076891 7/1967 United Kingdom .
1127579 9/1968 United Kingdom .

Primary Examiner—Gene Z. Rubinson
Assistant Examiner—James L. Dwyer
Attorney, Agent, or Firm—Roylance, Abrams, Berdo & Goodman

[57] ABSTRACT

A bridge rectifier circuit comprises a bridge of switching transistors 1 to 4 having their control terminals connected to switch the transistors to provide either full wave rectification of an a.c. input voltage or polarity correction of a d.c. input voltage of either polarity appearing at terminals A and B. The switching transistors are all of the same polarity type and at least two floating drivers 6 and 7 are connected to generate and supply control potentials to the control terminals respectively of a pair of the switching transistors.

In a preferred embodiment the switching transistors comprise field effect transistors. The floating drivers can comprise at least one respective bridge rectifier 12 capacitively linked to a source of voltage pulses 10 when the input voltage has a predetermined polarity, to generate the control potentials. Alternatively the floating drivers can comprise a voltage doubler or quadrupler capacitively linked to the source of voltage pulses. Such bridge rectifier circuits can be employed in a telephone instrument.

14 Claims, 6 Drawing Figures

BRIDGE RECTIFIER CIRCUIT

FIELD OF THE INVENTION

This invention relates to a means to rectify a.c. input voltages or varying d.c. input voltages and more particularly to bridge rectifier circuits employing field effect transistors (FET's).

DESCRIPTION OF THE PRIOR ART

Both transmission signals and power signals are frequently transmitted as a fluctuating voltage which is either an a.c. voltage, or a DC voltage of changed polarity.

In a telephone instrument since the components require a unidirectional voltage, it is convenient to rectify a received alternating voltage rather than provide an alternative power supply. This is particularly true where modern solid state components are employed which require compact equipment having unidirectional voltage sources.

Typically a diode bridge having two parallel component arms is employed to rectify the fluctuating voltage. However this type of bridge is limited to handling a working voltage across the bridge in excess of 1½ volts peak to peak since usual diodes in the bridge provide a voltage drop across the bridge of about 1.5 volts. The use of field effect transistors, instead of diodes permits a reduction in the voltage drop across the bridge. The transistor bridge rectifier comprises a two arm bridge network wherein one arm includes a pair of p-channel and one arm includes a pair of n-channel field effect transistors, for example metal oxide silicon (mos) FET's. The FET's are switched directly by the incoming line voltage to be rectified. A rectified output can be taken across the location where respective p-channel and n-channel FET's are coupled together. An example of such a bridge is illustrated in FIG. 1, the detailed construction and function of which will be familiar to one skilled in the art and need not be described herein.

Although the FET bridge illustrated gives a satisfactory performance, usage of the bridge is limited as a consequence of the cost and size of the p-channel FET's, cost and size beig important considerations in modern electronic equipment; in addition there can be a transmission of any disturbance on the incoming line into the output unidirectional voltage, since the gates of the FET switches are driven directly from the incoming line.

It is an object of the invention to provide a bridge rectifier wherein only n-channel FET switches need be utilized.

SUMMARY OF THE INVENTION

According to one aspect of the invention there is provided a bridge rectifier circuit comprising a bridge of switching transistors having their control terminals connected to switch the transistors to provide either full wave rectification of an a.c. input voltage or polarity correction of a d.c. input voltage of either polarity, the switching transistors being all of the same polarity type, and at least two floating drivers connected to generate and supply control potentials to the control terminals respectively of a pair of the switching transistors.

In one embodiment the floating driver comprises a bridge rectifier capacitively linked to a source of voltage pulses when the input voltage has a predetermined polarity. In another embodiment the floating driver comprises either a voltage doubler or voltage quadrupler capacitatively linked to a source of voltage pulses when the input voltage has a predetermined polarity. By using a floating driver, which provides an output having a predetermined level above that of a floating base voltage, it is possible to employ in the bridge rectifier circuit switching transistors which are solely n-channel FET's. In this way it is possible to significantly reduce the cost and size of the bridge and to also reduce the necessary working voltage across the bridge, for example to the order of 0.3 volts. As a result a bridge rectifier in accordance with the invention is suitable for use in a telephone instrument to provide the correct polarity voltage from the fluctuating input line voltage which can be positive or negative. It is also suitable for rectifying low secondary voltages from transformers, thereby increasing the efficiency of and reducing the power dissipation therefrom, permitting smaller and cheaper transformers to be used.

According to another aspect of the invention there is provided a rectifier circuit comprising a bridge of switching transistors having their control terminals connected to switch the transistors to provide either full wave rectification of an a.c. input voltage or a polarity correction of a d.c. input voltage of either polarity, respective transistors having their control terminals connected to respective independent floating drivers which generate and supply control potentials to said terminals.

In this way the control of rectifier circuit output is isolated from the input alternating voltage.

Examples of embodiments of the invention will now be described with reference to the accompanying drawings, in which:

BRIEF DESCRIPTION OF THE DRAWINGS

Referring to FIG. 2, input terminals A and B receive either an a.c. input line voltage to be rectified or a D.C. line voltage of either polarity to be corrected. Two component chains are connected in parallel across the input terminals. The first chain comprises an n-channel MOSFET 1 having its source S1 coupled at a point X to the source S4 of a further n-channel MOSFET 4. The second chain comprises an n-channel MOSFET 2 having its drain D2 coupled at a point Y to the drain D3 of a further n-channel MOSFET 3. The points X and Y provide a D.C. output voltage which can be connected across a load 5.

Figure 1:
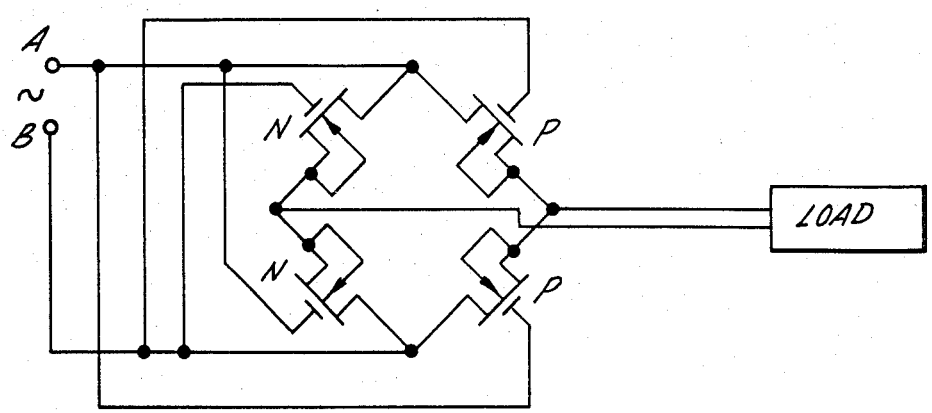
FIG. 1 illustrates a prior art bridge rectifier.

In the first chain the gate G1 of MOSFET 1 is connected to terminal B and the gate G4 of MOSFET 4 is connected to terminal A. Clearly as the gate to source voltage Vgs becomes positive for the respective MOSFET's 1 and 4, they will become conductive. Vgs of MOSFET 1 becomes positive when the voltage at input A relative to input B ($V_{AB}$) is negative. Similarly the Vgs of MOSFET 4 becomes positive when the line polarity reverses.

In the second chain the gate G2 of MOSFET 2 is connected to the positive output of a floating driver, generally identified by the numeral 6, the base terminal of the driver 6 being connected to the source S2 of the MOSFET 2. The gate G3 of MOSFET 3 is connected to the positive output of a floating driver, generally identified by the numeral 7. The base terminal of the driver 7 being connected to the source S3 of the MOSFET 3. Each driver is connected to an oscillator 10. The oscillator is connected firstly by a capacitor 11 to a diode bridge 12, and secondly through an invertor 13 and a capacitor 14 to the diode bridge. A voltage is dropped across the diode bridge whenever oscillator pulses are emitted, and this voltage can be dropped across a resistor 15 to provide a voltage on the terminal P which is a predetermined amount above the voltage on terminal Q, irrespective of the level of voltage on terminal Q.

The oscillator supplying driver 7 is connected to a diode 16 to terminal B and directly to terminal A. A gate (not shown) incorporated within the oscillator opens to allow oscillator pulses to pass to the diode bridge 12 only when the diode 16 conducts, that is to say when the polarity of $V_{AB}$ is negative. The consequent voltage appearing on terminal P causes a positive value of Vgs for the MOSFET 3 and hence it becomes conductive.

Similarly, the oscillator connected to driver 6 is connected by a diode 16 to terminal A and directly to terminal B. Consequently oscillator pulses are allowed to pass to the diode bridge 12 only when the polarity $V_{AB}$ is positive. The consequent voltage appearing at the terminal P causes a positive value of Vgs for MOSFET 2 and hence MOSFET 2 becomes conductive.

It will be apparent to one skilled in the art that when $V_{AB}$ is positive MOSFET 4 and MOSFET 2 become conductive, hence the voltage appearing across terminals X and Y ($V_{XY}$) is negative. When $V_{AB}$ is negative $V_{XY}$ is again negative, because this time MOSFET 1 and MOSFET 3 become conductive. Therefore any changing polarity voltage (whether A.C or D.C) across terminals A and B is rectified by the bridge rectifier in accordance with the invention. It will be apparent that the utilization of floating drivers allows the use of p-channel FET's to be eliminated. However, it is clear that other forms of switching means could be employed instead of MOSFET's 1 to 4. Preferably the oscillator 10 supplying each floating driver is powered, from the signal voltage applied to terminals A and B.

Figure 2:
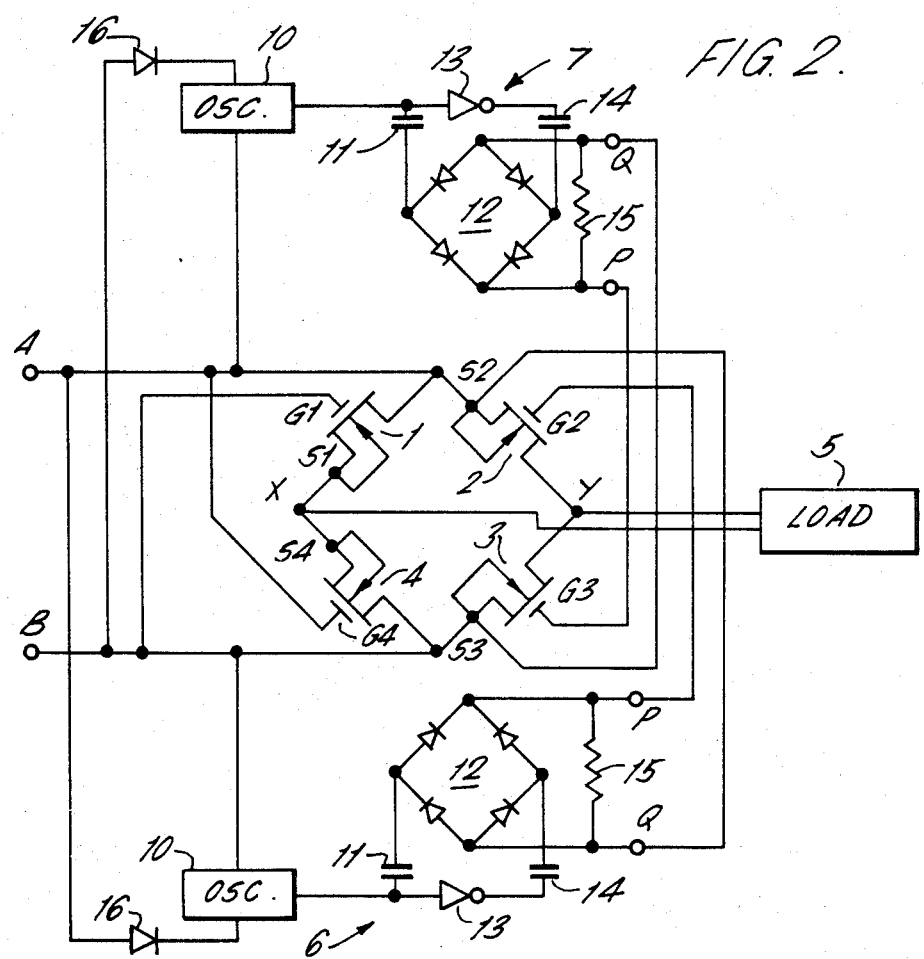
FIG. 2 illustrates a bridge rectifier circuit in accordance with the invention.
Figure 3:
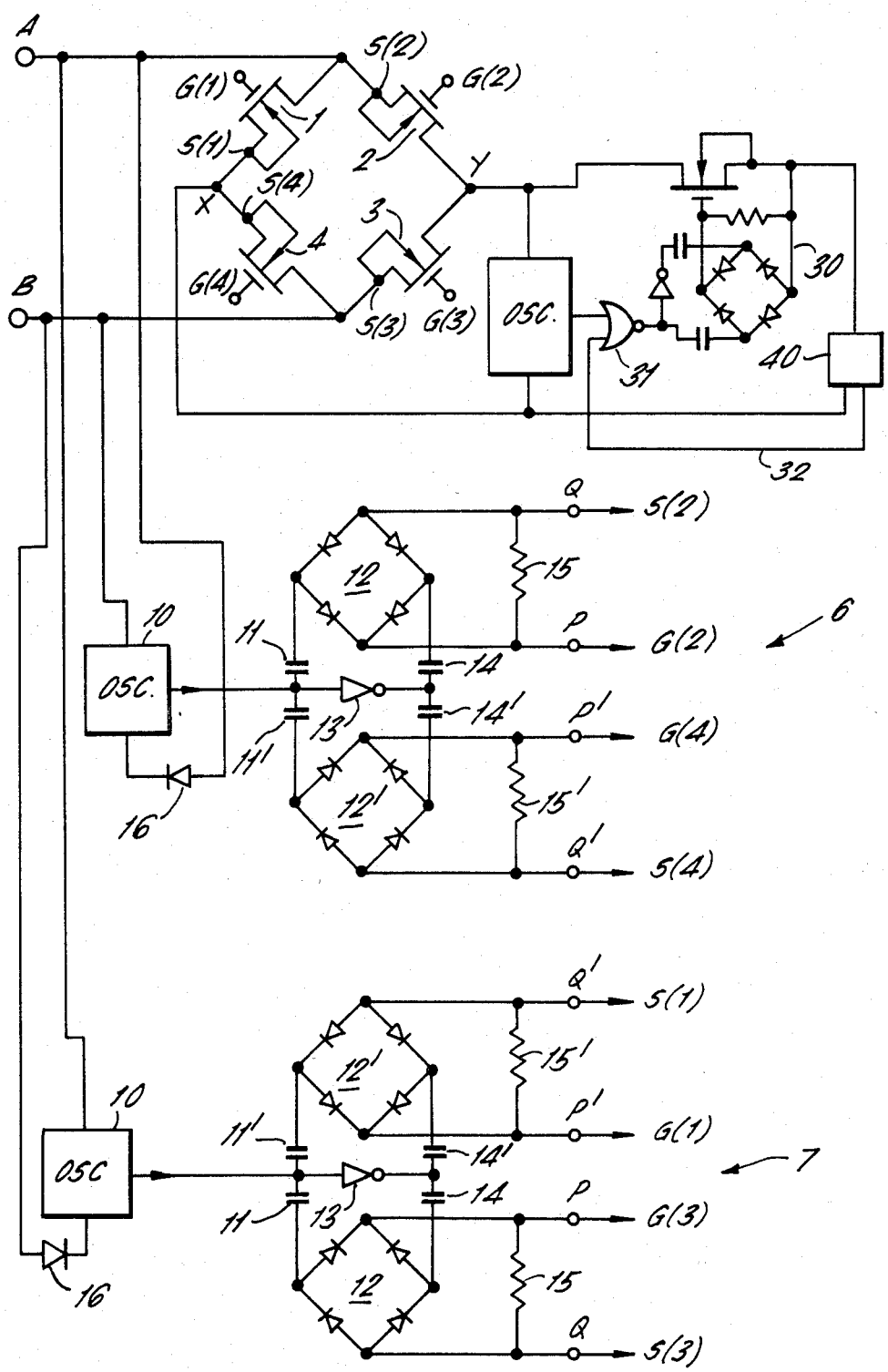
FIG. 3 illustrates a bridge rectifier circuit in accordance with the invention for use in a telephone instrument.

FIG. 3 illustrates a bridge rectifier in accordance with the invention wherein the rectification is isolated from direct interference from the input line voltage in that it employs twinned floating drivers 6 and 7 which switch all MOSFET switches in the bridge. It will be apparent that components common to FIGS. 2 and 3 share the same reference numerals. The circuit uses high voltage switches since they have to withstand high line transient voltages during operation. The drivers 6 and 7 illustrated in FIG. 3 include further bridge circuits 12' capacitively linked across the inverter 13 by means of capacitors 11' and 14'. The voltage across the bridge 12' in driver 7 appearing at terminals P' and Q' is dropped across a resistor 15' and is used to operate the MOSFET 1, the positive voltage from terminal P' being applied to the gate G(1) and the base voltage being applied to the source S(1). Similarly, the voltage across the bridge 12' in driver 6 is dropped across a resistor 15' and is used to operate MOSFET 4, the positive voltage being applied to the gate G(4) from terminal P' and the base voltage being applied to the source S(4).

Consequently in driver 6 only when $V_{AB}$ is positive will the gate incorporated within oscillator 10 be activated to permit oscillator pulses to pass to the diode bridge 12. This results in the MOSFET's 2 amd 4 being made conductive and $V_{XY}$ will be negative. In driver 7 only when $V_{AB}$ is negative will the gate incorporated within oscillator 10 be activated to permit oscillator pulses to pass to the diode bridge 12. This results in the MOSFET's 1 and 3 being made conductive and $V_{XY}$ will again be negative.

Therefore an alternating input signal appearing at terminals A and B is rectified to produce a unidirectional voltage at terminals X and Y. This arrangement of controlling the FET's is isolated from variations and surges appearing across terminals A and B and is therefore of particular use in a telephone instrument 40, which can be connected across terminals X and Y. An isolating switch designated generally by numeral 30 is incorporated between the telephone instrument 40 and terminals X and Y. The isolating switch employs a floating driver system similar to that employed for MOSFET's 1 to 4 and is not described in detail here. This switch isolates the load in the instrument from high voltage pulses which appear on the line when a number is being dialled by connecting an impulsing line 32 from the telephone instrument to a NOR gate 31 through which oscillator pulses for the switch 30 can only pass when a logic signal does not appear on impulsing line 32.

Figure 4:
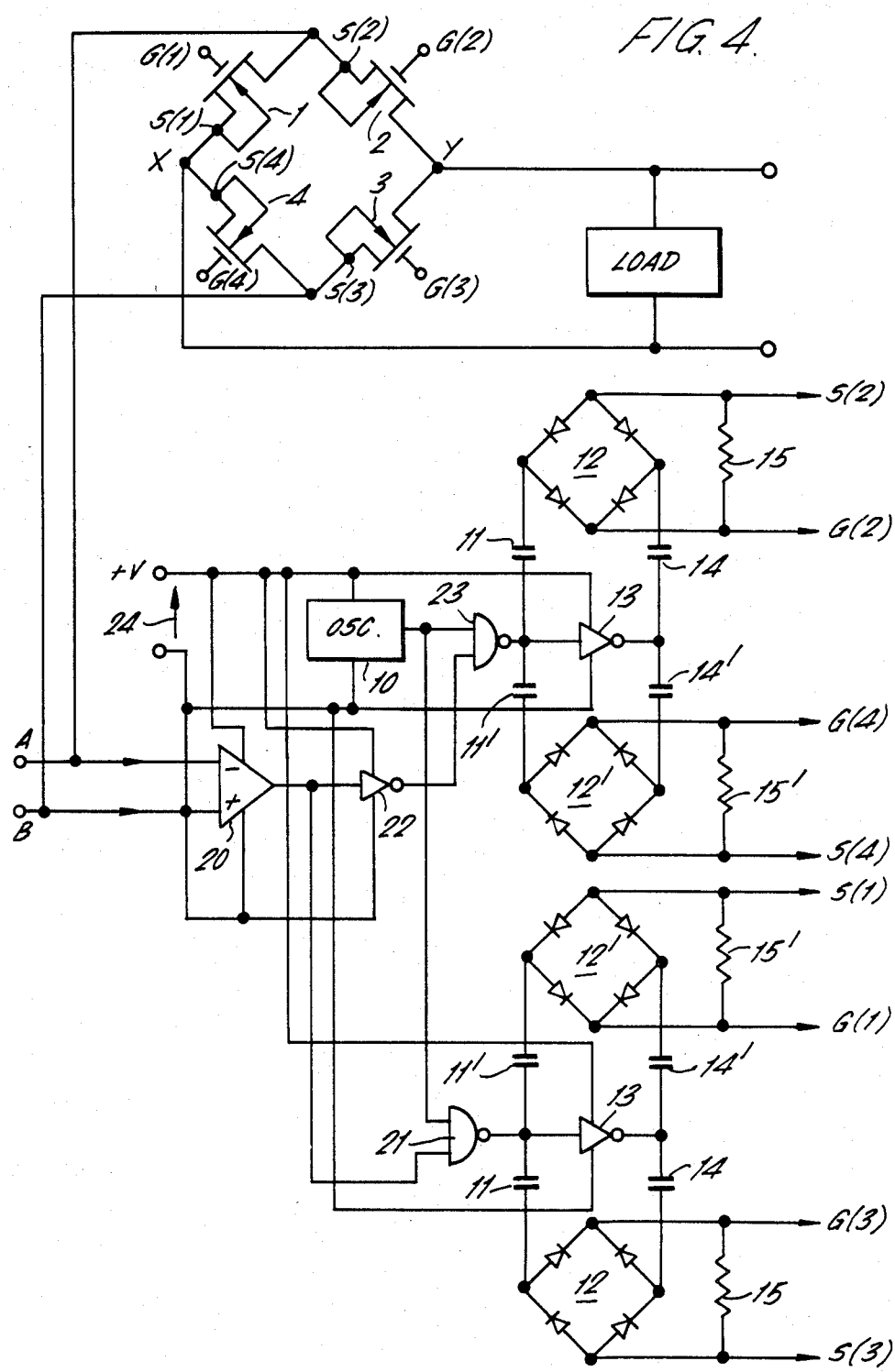
FIG. 4 illustrates a bridge rectifier circuit in accordance with the invention for use with a transformer.

FIG. 4 illustrates a further bridge rectifier wherein small AC input signals can be rectified. Components common to FIGS. 3 and 4 share the same reference numerals. AC input signals from say a secondary winding of a transformer (not shown) are fed onto terminals A and B. In addition to connection to the two component chains, the terminals are connected to a comparator 20 such that an output is produced whenever $V_{AB}$ is negative. The output from the comparator is fed to a NAND gate 21, connected to driver 7, which receives oscillator pulses from oscillator 10. Consequently whenever $V_{AB}$ is negative gate 21 is opened to permit oscillator pulses to reach diode bridges 12 and 12' to switch on MOSFET's 1 and 3 thereby producing a negative value of $V_{XY}$.

The comparator 20 is also connected through an invertor 22 to a further NAND gate 23, connected to driver 6, which receives oscillator pulses from oscillator 10. Consequently whenever $V_{AB}$ is positive gate 23 is opened to permit oscillator pulses to reach diode bridges 12 and 12' to switch on MOSFET's 2 and 4 thereby again producing a negative value of $V_{XY}$.

Therefore the alternating input signal appearing at terminals A and B is rectified to produce a unidirectional voltage at terminals X and Y. The circuit shown allows a small voltage input to be rectified because the oscillator is powered by a separate power supply 24 which can also be used to power the comparator 20 and invertors 13 and 22.

Figure 5:
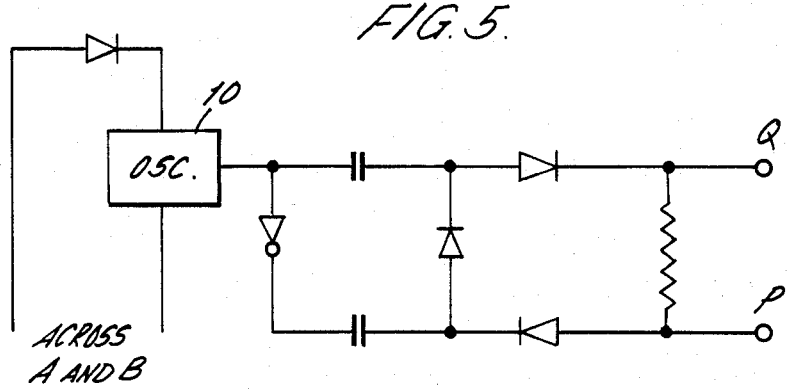
FIG. 5 illustrates a floating driver in the form of a voltage doubler.
Figure 6:
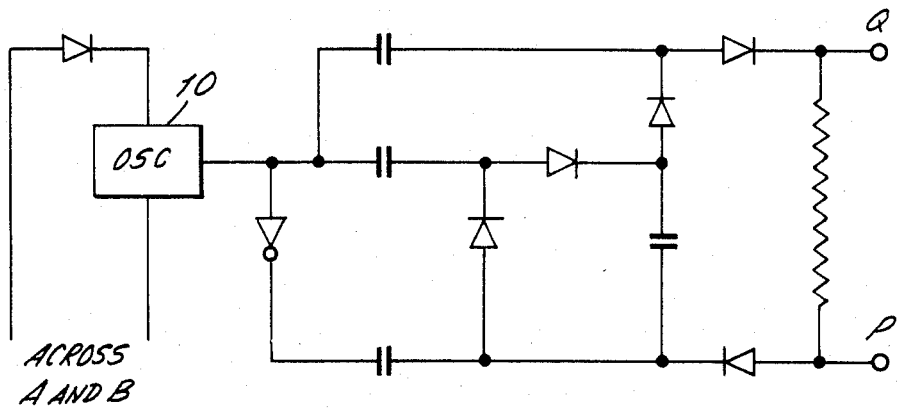
FIG. 6 illustrates a floating driver in the form of a voltage quadrupler.

It will be apparent that there are alternatives to the floating drivers illustrated in FIGS. 2 to 4. For example, a voltage doubler or voltage quadrupler, as illustrated in FIGS. 5 and 6 respectively could be employed. These floating drivers illustrated use a network of diodes linked by capacitors to oscillator 10 which act as a form of diode pump. Clearly the form of voltage doubler or quadrupler is not limited to the design illustrated and other integer increases could be used.

In this way the voltage appearing at outputs Q and P can be doubled or quadrupled with regard to the supply voltage from the oscillator (neglecting voltage losses across the diodes) thus allowing a step up of voltage from one below the control potential for the MOSFET's to one above the control potential for the MOSFET's.

It will be apparent that a bridge rectifier in accordance with the invention has many uses which are not disclosed herein but will be apparent to a person skilled in the art.

We claim:

1. A bridge rectifier circuit comprising a bridge of switching transistors having their control terminals connected to switch the transistors to provide either full wave rectification of an AC input voltage or polarity correction of a DC input voltage of either polarity, the switching transistors being all of the same polarity type, at least two floating drivers connected to generate and supply control potentials to the control terminals respectively of a pair of the switching transistors, said floating drivers comprising a source of voltage pulses, means controlling said source to produce voltage pulses only when the input voltage has a predetermined polarity, a respective bridge rectifier for each said driver, and capacitor means linking each said respective bridge rectifier to the said sorce of voltage pulses, and the rectified outputs of said bridge rectifiers providing said control potentials to said control terminals of the switching transistors.

2. A rectifier circuit according to claim 1 wherein the switching transistors comprise field effect transistors.

3. A rectifier circuit according to claim 1 wherein all of the switching transistors have their control terminals connected to respective floating drivers.

4. A telephone instrument including a bridge rectifier circuit according to claim 1.

5. A telephone instrument according to claim 4, the rectifier circuit providing a DC supply for electronic circuitry within the instrument, and including an isolating switch arranged to isolate the DC output of the rectifier circuit from the circuitry in the instrument in response to dialling signals generated in the instrument.

6. A telephone instrument according to claim 5, wherein the isolating switch comprises a switching transistor in series with the DC output of the rectifier circuit, and a floating driver connected to supply a control potential across the control terminals of the switching transistor, said floating driver being responsive to a control signal produced by the telephone instrument to indicate that dialling signals are being generated, to turn off the switching transistor.

7. A telephone instrument according to claim 6, wherein the floating driver comprises a bridge rectifier capacitively linked to a source of voltage pulses only in the absence of the control signal.

8. A bridge rectifier circuit comprising a bridge of switching transistors having their control terminals connected to switch the transistors to provide either full wave rectification of an A.C. input voltage or polarity correction of a D.C. input voltage of either polarity, the switching transistors being all of the same polarity type, and at least two floating drivers connected to generate and supply control potentials to the control terminals respectively of a pair of switching transistors, said floating drivers comprising a source of voltage pulses, means controlling said source to produce voltage pulses only when the input voltage has a predetermined polarity, a respective voltage doubler for each said driver and capacitor means linking each said respective voltage doubler to the source of voltage pulses, and the output of said voltage doublers providing said control potentials to said control terminals of the switching transistors.

9. A rectifier circuit according to claim 8 wherein each voltage doubler comprises a network of diodes and capacitors arranged to form a diode pump.

10. A bridge rectifier circuit comprising a bridge of switching transistors having their control terminals connected to switch the transistors to provide either full wave rectification of an A.C. input voltage or polarity correction of a D.C. input voltage of either polarity, the switching transistors being all of the same polarity type, and at least two floating drivers connected to generate and supply control potentials to the control terminals respectively of a pair of the switching transistors, said floating drivers comprising a source of voltage pulses, means controlling said source to produce voltage pulses only when the input voltage has a predetermined polarity, a respective voltage quadrupler for each said driver, and capacitor means linking each said respective voltage quadrupler to the source of voltage pulses, and the output of said voltage quadruplers providing said control potentials to said control terminals of the switching transistors.

11. A rectifier circuit according to claim 8 wherein all of the switching transistors have their control terminals connected to respective floating drivers.

12. A rectifier circuit according to claim 10 wherein all of the switching transistors have their control terminals connected to respective floating drivers.

13. A telephone instrument including a bridge rectifier circuit comprising a bridge of switching transistors having their control terminals connected to switch the transistors to provide either full wave rectification of an AC input voltage or polarity connection correction of a DC input voltage of either polarity, the switching transistors being all of the same polarity type, and at least two floating drivers connected to generate and supply control potentials to the control terminals respectively of a pair of the switching transistors, the rectifier circuit providing a DC supply for electronic circuitry within the instrument, and including an isolating switch arranged to isolate the DC output of the rectifier circuit from the circuitry in the instrument in response to dialing signals generated in the instrument, wherein the isolating switch comprises a switching transistor in series with the DC output of the rectifier circuit, and a floating driver connected to supply a control potential across the control terminals of the switching transistor, said floating driver being responsive to a control signal produced by the telephone instrument to indicate that dialing signals are being generated, to turn off the switching transistor.

14. A telephone instrument according to claim 13, wherein the floating driver comprises a bridge rectifier capacitively linked to a source of voltage pulses only in the absence of the control signal.

* * * * *